US011394629B1

(12) United States Patent
Grilli et al.

(10) Patent No.: US 11,394,629 B1
(45) Date of Patent: Jul. 19, 2022

(54) GENERATING RECOMMENDATIONS FOR NETWORK INCIDENT RESOLUTION

(71) Applicant: Amazon Technologies, Inc., Reno, NV (US)

(72) Inventors: Gianluca Grilli, Seattle, WA (US); John William Evans, Frome (GB); Robert William Burke, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/119,560

(22) Filed: Dec. 11, 2020

(51) Int. Cl.
| | |
|---|---|
| *G06F 15/173* | (2006.01) |
| *H04L 43/04* | (2022.01) |
| *G06F 7/08* | (2006.01) |
| *G06F 16/953* | (2019.01) |
| *G06F 16/28* | (2019.01) |
| *G06Q 10/06* | (2012.01) |
| *G06Q 10/10* | (2012.01) |

(52) U.S. Cl.
CPC ............... *H04L 43/04* (2013.01); *G06F 7/08* (2013.01); *G06F 16/285* (2019.01); *G06F 16/953* (2019.01); *G06Q 10/0639* (2013.01); *G06Q 10/10* (2013.01)

(58) Field of Classification Search
CPC ..... H04L 43/04; G06F 16/285; G06F 16/953; G06F 7/08
See application file for complete search history.

(56) References Cited

U.S. PATENT DOCUMENTS

| | | | |
|---|---|---|---|
| 2018/0150928 A1* | 5/2018 | Dejewski | G06Q 10/06315 |
| 2019/0347282 A1* | 11/2019 | Cai | G06F 3/0482 |

* cited by examiner

*Primary Examiner* — Yves Dalencourt
(74) *Attorney, Agent, or Firm* — Hogan Lovells US LLP

(57) ABSTRACT

Cause and remediation data from one or more prior network incidents can be identified using a determined global similarity between these prior incidents and a current incident. Various network data can be collected, and data determined to potentially be relevant to a current incident can be selected or clustered into a single document or file. This document can have relevant features extracted, which can be used to generate a smaller numerical representation, or fingerprint, of the current incident. This fingerprint may be broken down into three categories of incident data, as may include general, topology, and alert categories. These categories of data can be compared for a current network incident and one or more prior incidents using their respective fingerprints, such as by using cosine similarity determinations. These values can be combined into global similarity values, which can be used to identify similar incidents as well as to provide visualization.

20 Claims, 7 Drawing Sheets

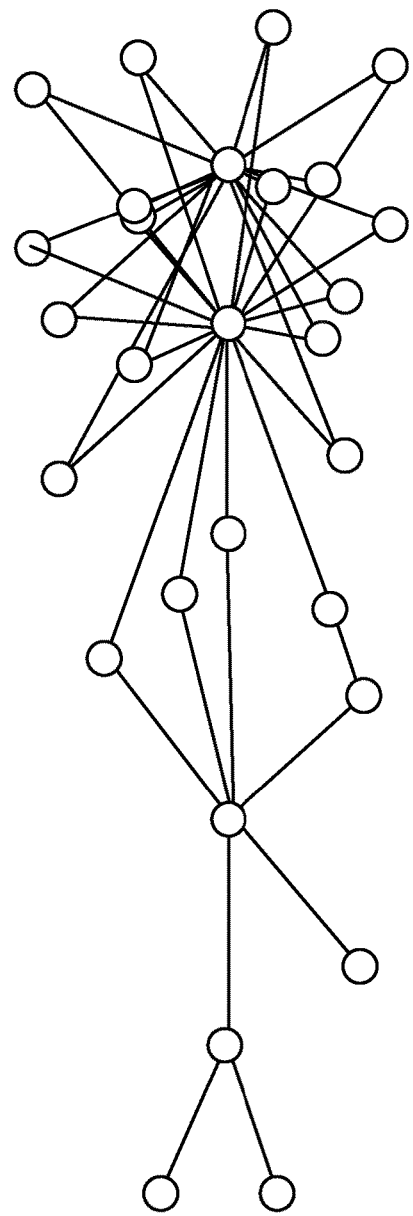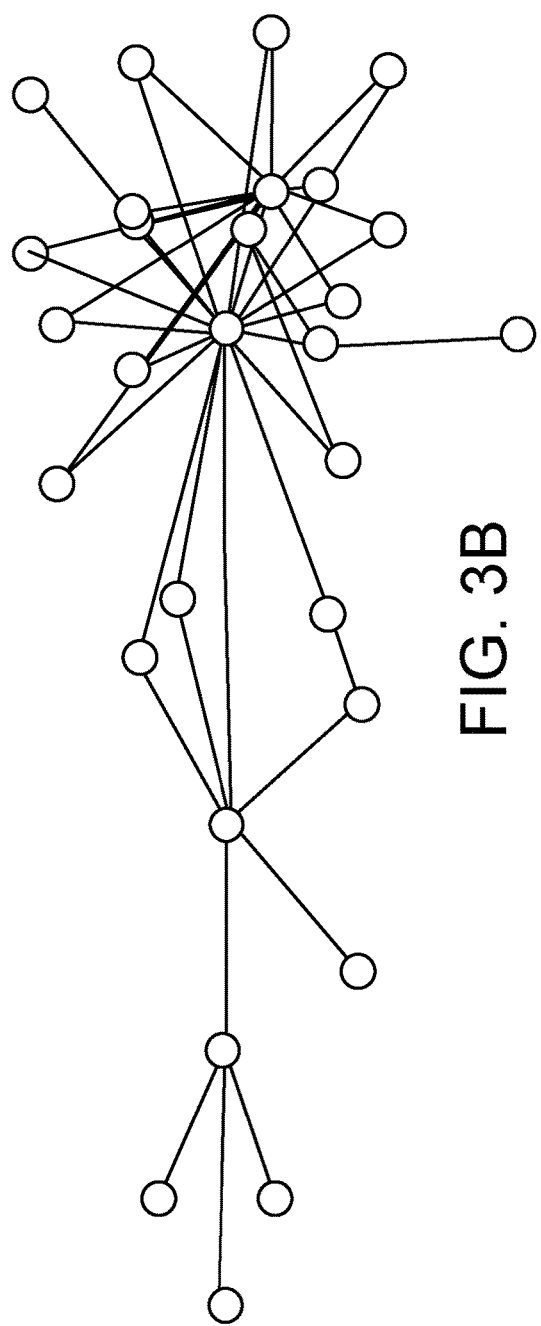
FIG. 3A
FIG. 3B

GENERATING RECOMMENDATIONS FOR NETWORK INCIDENT RESOLUTION

BACKGROUND

Computer networks are increasingly being used to support a variety of important applications and services. There may be various types of incidents or situations where one or more events may occur that may negatively impact these applications and services. These events can include, for example, the unavailability of a device interface or a failure of a power supply unit. A response to such an incident can involve handling the effect(s) in a manner that contains the disruption of those applications and services that rely on the network infrastructure. A response can also involve a root cause analysis in order to execute specific actions or workflows that eradicate at least the primary cause of the incident. While some incidents are simple in the way they occur and propagate in the network so that specific actions can be automatically executed, other incidents are more complex, and it is not possible to automatically execute a mitigation or a remediation workflow. These complex incidents can require a significant amount of time to manually diagnose and remediate. Because incidents can involve different sets of events, the diagnosis often must start more or less from scratch.

BRIEF DESCRIPTION OF THE DRAWINGS

Various embodiments in accordance with the present disclosure will be described with reference to the drawings, in which:

FIGS. 3A and 3B illustrate example network topologies whose similarity can be determined in accordance with various embodiments.

DETAILED DESCRIPTION

Approaches in accordance with various embodiments can be used to diagnose causes of incidents in computer networks, as well as to determine appropriate remediation actions to take for those network incidents. In at least one embodiment, various types of network data can be collected, and relevant data can be identified or clustered that is determined to have a probability of being relevant to a detected network incident. This relevance may be based upon factors such as proximity in location or time. This clustered data, which may be in the form of a large document of event, network configuration, and alert data, can be transformed into a numerical array that is representative of the incident. This numerical array, or incident "fingerprint," can include three sections in at least one embodiment that correspond to incident categories such as general data, topology data, and alert data. Incident fingerprints over a determined period of time, for example, can be compared to the incident fingerprint for a current incident to determine similarities. This can include, for example, determining cosine similarities for each of the three categories of incident data between pairs of the current incident fingerprint and a prior incident fingerprint. These three cosine similarity values can then represent dimensions in similarity space, where a global vector can be plotted that represents a global similarity value for a given pair of incident fingerprints. The incidents with the highest global similarity values can be visualized using these vectors in three-dimensional similarity space. An operator can then decide whether any of these prior incidents are sufficiently similar to a current incident, based at least in part upon this global similarity value, such that the source and remediation data for those prior events can be used as a starting point to determine a root cause and remediation for the current incident. Such a process can save an operator a significant amount of time in identifying similar incidents, particularly where those events may not otherwise seem particularly similar. The cause and remediation data from these similar incidents can then be performed, sometimes in an automated fashion, to attempt to benefit from the work in identifying cause and remediation data for one or more similar incidents that occurred in, for example, the recent past.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1:
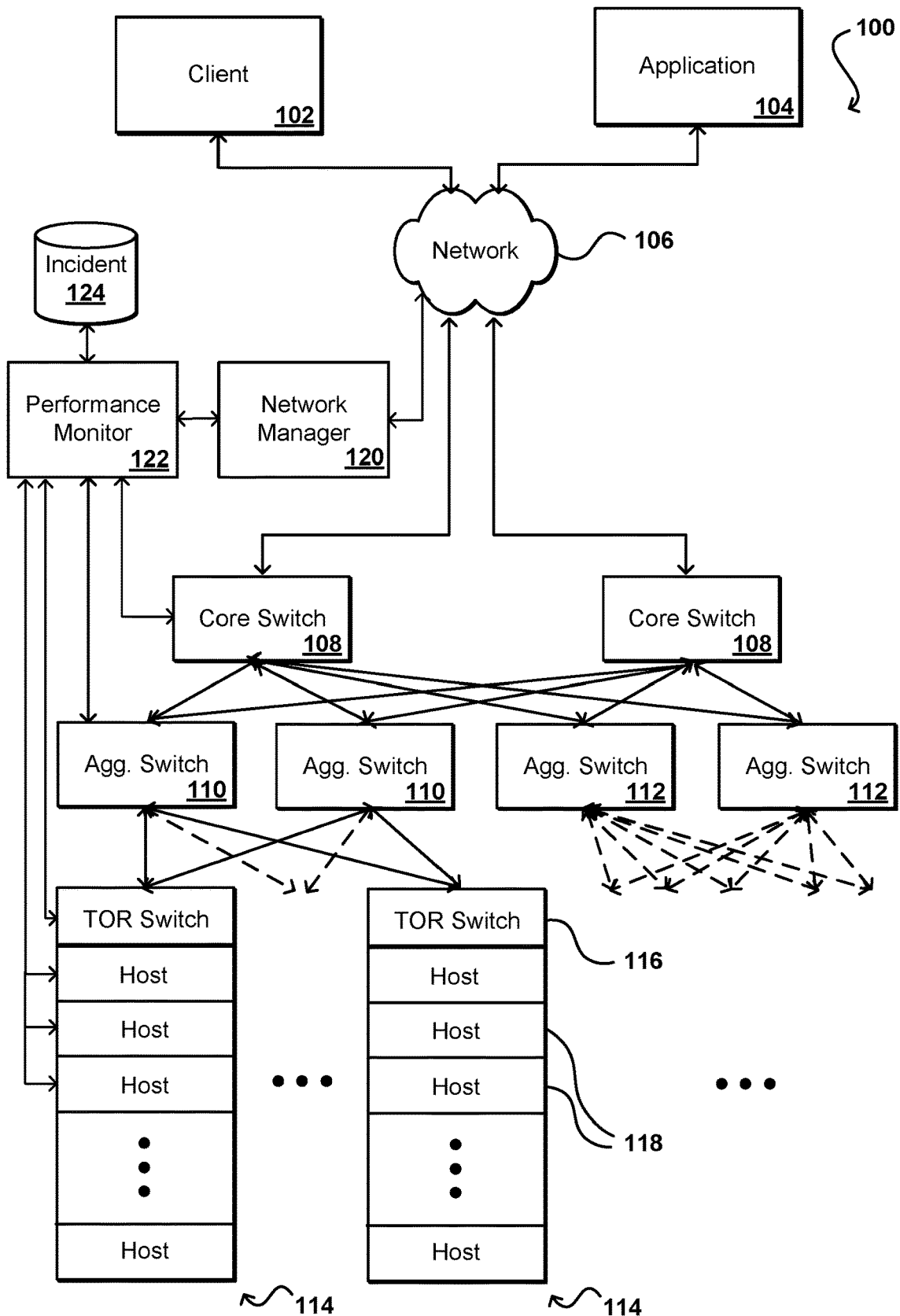
FIG. 1 illustrates an example network that can be utilized in accordance with various embodiments.

FIG. 1 illustrates an example network architecture 100 in which aspects of various embodiments can be implemented. This example network configuration that can be used to route communications between specific host machines or other such devices in such an environment. It should be understood that this is merely an example networking environment, and there can be various other configurations, components, and arrangements used for other networks in accordance with the various embodiments. This example shows a typical design that can be used for an environment such as a data center, wherein a source such as a client device 102 or application 104 is able to send requests across at least one network 106, such as the Internet or a cellular network, to be received by one or more components of the network 100. Properties of various components of the network, such as provisioned resource instances, etc., can be managed using at least one management system, component, or service 120. In this example, the requests are received over the network to one of a plurality of core switches 108, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 108 is able to communicate with each of a plurality of aggregation switches 110, 112, which in at least some embodiments are utilized in pairs. Utilizing aggregation switches in pairs provides a redundant capability in case one or the switches experiences a failure or is otherwise unavailable, such that the other device can route traffic for the connected devices. As can be seen, each core switch in this example is connected to each aggregation switch, such that the tiers in this example are fully connected. Each pair of aggregation switches 110, 112 is linked to a plurality of physical racks 114, each of which typically contains a top of rack (TOR) or "access" switch 116 and a plurality of physical host machines 118, such as data servers and other processing devices. As shown, each aggregation switch can be connected to a number of different racks, each with a number of host machines. For the respective portion of the network, the aggregation pairs are also fully connected to the TOR switches.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as one hundred twenty racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 106. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting twenty-one hosts in a rack, for example, each of three switches in the rack can act as a local TOR switch for a "logical" rack (a sub-rack of a physical rack or logical grouping of devices (hosts and/or switches) from multiple racks), with each local TOR switch connecting seven of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

In various networks, there may also be many such data centers in various locations or regions, which may also be connected by a network of devices. This can include, for example, use of a backbone network or other such network to connect the various data centers. There may also be local networks that connect devices and data centers within a region, as well as networks that connect one or more regions.

As should be apparent, such a network can be quite complicated, with a large number of connections between a large number of devices, of multiple types, in different regions or locations. An incident may occur in such a network, which may impact a number of connected devices in that network. An incident may refer to an occurrence in a network, that may be undesired or unexpected, which can be associated with a number of detected events and/or alarms in a relatively compact (or otherwise grouped) space or time in a network, such as a mesh network or the Internet. When an incident occurs in such a network, it can be difficult to determine the cause or extent of the incident, as well as to determine how to best remediate or address the incident. In at least one embodiment, various network devices, as well as devices connected to a network, can generate alarms or notifications upon detection of an event, where that event may be one of a number of event types that have been designated as worthy of generating such an alarm or notification. An event may be indicative of an underlying cause of an incident. The evolution of events detected for an incident may be viewed as a network incident signature in at least some embodiments. The devices can be configured or programmed to provide these alarms, or there can be sensors or components added to provide these alarms, among other such options. In some embodiment this may not include alarm data, but data for an event or occurrence in the network that may be relevant to an incident.

In at least one embodiment, this event data can be collected by (or otherwise received to) a system, service, component, application, or process such as a performance monitor 122. The performance monitor 122 can receive this information and store at least a relevant subset of this data to an incident or event repository 124. In other embodiments, this data may be received to an incident repository 124 and then accessed by a performance monitor 122. The performance monitor 122 can then provide information about an incident, whether through a display, report, notification, or other such mechanism. This can include event information that may be relevant to a determined or detected incident. The relevance may be determined based upon factors such as a proximity (in the network topology) to a determined incident, event data captured over a window of time, or event data captured within a determined region, among other such options or combinations thereof. This information can be provided to a network operator, for example, who can use this information to attempt to diagnose and remediate the network incident. Steps taken to remediate the incident can also be entered or captured through the performance monitor 122 or network manager 120, for example, and can be stored with the event data in the incident repository.

As mentioned, however, networks can be very complex such that an incident may likely not be exactly the same as an earlier incident, as it may involve a different set of devices in a different location, or may receive data from a different set of alarms, among other potential differences. A single root cause might propagate differently in different instances, and different root causes may propagate similarity which can make it more difficult to compare data for different incidents. Even though remediation data may be stored for a prior incident, a network operator may not be able to determine that the remediation data is relevant to a subsequent event.

Accordingly, approaches in accordance with various embodiments can attempt to leverage information for prior network incidents to recommend actions to be taken in order to resolve or mitigate subsequent network incidents. As mentioned, network incidents can include situations where an event (e.g., a device interface down) or a set of events (e.g., a power supply unit failure which causes a cooler fan malfunction which, in turn, leads to multiple interfaces being shutdown) impact one or more applications, processes, systems, or services. An operator being notified of an incident can attempt to contain the incident to prevent any further disruption. The operator can then attempt to determine the root cause of the incident, and take one or more actions necessary to mitigate the incident, as well as to prevent (or reduce a likelihood of) future occurrences of this type of event.

In at least one embodiment, each network incident can be identified by a specific set of features, or a numerical fingerprint, that captures details associated with an event, as may relate to a physical location of the incident, network hardware or software that is involved, a duration of the incident, a topological connectivity relevant to the incident, and a distribution of alerts (or other available signal or data relevant to monitoring of a network). A recommendation engine can use this data to recommend one or more actions that have a probability of being able to fix or mitigate the issue, at least in situations where no automation can be achieved. For a specific network incident, the recommendation engine can retrieve data for the most similar incident(s) that occurred in the past and can use that data to determine and suggest possible actions. Such a system can be completely unsupervised, in that it is capable of retrieving useful information based on historical events with no supervision from operators. As mentioned, network incidents can occur at different logical layers, from the infrastructure up to the application level, and such an approach can work with all of the mentioned incident classes, as well as other types of networks such as ad-hoc networks, sensor networks, and the like.

Figure 2A:
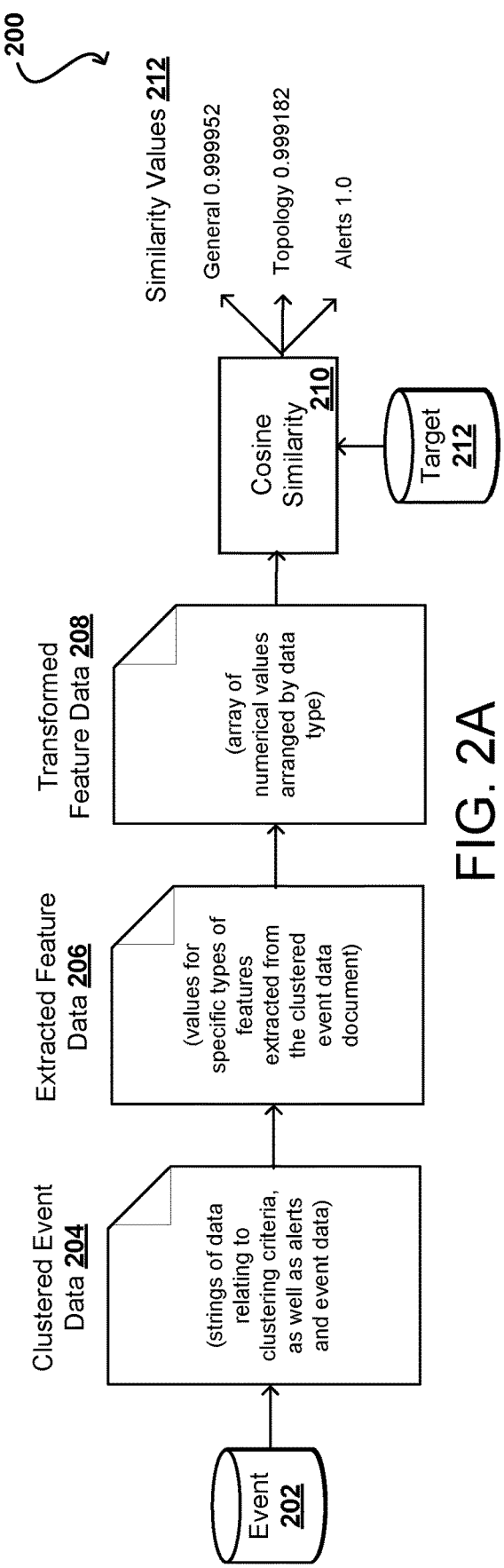
FIGS. 2A and 2B illustrate data of an incident similarity determination process that can be utilized in accordance with various embodiments.

In at least one embodiment, various types of event data can be collected and stored to one or more locations, such as an event repository 202, as illustrated in the example similarity pipeline 200 of FIG. 2A. As mentioned, this can include any types of data that are potentially relevant to an incident, such as alarm data, device state, interface state, and the like. When an incident is detected, for example, data from this event repository can be selected that may relate to this event, such as may satisfy various criteria with respect to the incident. This may include, for example, data captured during a window of time around the incident, data captured within a determined region or network portion associated with the incident, or data for devices that might be involved in the incident, among other such options. In at least one embodiment, there may be a clustering or selection algorithm used that can analyze these data using these or other such rules or logic, and can identify and select data potentially relevant to an incident. In at least one embodiment, this clustered or selected event data for an incident can be stored or written to a file or document, such as a clustered event data document 204. This document may have a determined format, such as a JSON (JavaScript Object Notation) document format. This can include strings, values, or other data for those various events, alerts, states, or other collected data. This information can also include information about how those devices are connected and one or more regions where the incident was observed to occur.

It can be desirable, in at least some embodiments, to transform this document into a form that may be more useful for automated similarity determinations. This can include, for example, selecting data that is determined to be relevant, grouping types of data, and causing the data to be in a consistent format. Relevant data may include, for example, cluster identifier, incident time, incident region, impacted devices, alarm states, and so on. This can also involve compressing a large JSON document into a much smaller document or file that contains relevant feature data and will take less resource capacity to process. In at least some embodiments, this can include representing each data entry as a numerical value associated with a string, as a key-value pair, and grouping these numerical values by groups or types of data. This can involve extracting relevant feature data, converting that data to numerical values using determined formulas or logic, and grouping by at least three groups. In at least one embodiment, this can include grouping data by three types of data, such as general data, topology data, and alert data, among other such options. In at least one embodiment, general feature data can include data related to a region count or code, a data center identifier, a rack identifier, a network zone count or code, or an incident duration, among other such options. Topology feature data can include features such as node or device count, diameter or connection length, percentage of isolated nodes or devices, number of central nodes or devices, and graph entropy (representative of disorder of a structure of a network graph representing the topology), as well as potentially graph transitivity, which provides an indication of a level of clustering. The alerts feature set can include one value for each possible alarm, where that value can be binary to represent an alarm state or a non-alarm state for each determined alarm (or sensor, etc.).

This extracted feature data document 206 can also be in a form that is human-readable, which can help an operator to understand the event data identified as relevant for the incident. In some embodiments, this human-readable form may not be needed or generated, and the JSON document can be used to create the incident array directly. In order to compare these features to features for other events, it may further be desirable to transform this data to a form that lends itself to automated comparison. In this example, the transformation can involve a transformation of these numerical values to a numerical array arranged by data type. This can include a portion of the array with numerical values for a general data category, a portion of the array with numerical values for a topology data type, and a portion of the array with numerical values for an alert data type. In one embodiment, the array portion may include a binary data value for each relevant alarm, indicating whether the alarm was in an alarm state (with a value of 1) or not in an alarm state (with a value of 0). The general data can include information about the incident in general, such as a time and location of the incident. The topology data can include information identifying device involved in the incident, as well as their connections and other such aspects.

Once this array 208 of transformed feature data is obtained, it can be compared against transformed feature data for other, prior incidents. The prior incidents that are analyzed may be over a relatively recent period of time, as the network may have changed device, state, or topology at one or more other times in the past, which may make source and remediation data less useful or applicable. The array can function as a fingerprint that identifies, or is indictive of, a specific incident, and these different fingerprints can be compared for similarity determinations. Different incident arrays, or incident fingerprints, can be of a same size, to facilitate comparison, particularly useful for some machine learning applications. Such a comparison can help to identify a similarity between data for a current incident of interest and prior incidents, which can enable using remediation information for a similar incident to be used to diagnose and remediate the current incident. In at least one embodiment, this comparison can involve determining one or more cosine similarity values 212 using one or more cosine similarity determination modules 210 or algorithms. This can include performing a cosine similarity, or other such comparison, for each of the three categories or portions of the transformed feature data 208 with respect to data for one or more prior incidents, as may be stored to a target database 212 or other such location. In at least one embodiment, the cosine similarity can be determined as given by:

$$\operatorname{Cos}(\theta) = \frac{\vec{x} * \vec{y}}{\|\vec{x}\|\|\vec{y}\|} = \frac{\sum_{i=1}^{n} x_i y_i}{\sqrt{\sum_{i=1}^{n} x_i^2} \sqrt{\sum_{i=1}^{n} y_i^2}}$$

For each pair of arrays, including the array for the current incident and an array for a prior incident, three similarity values 212 can be generated for these categories, as may include a general similarity value, a topology similarity value, and an alert similarity value. Each similarity value can be determined through the cosine similarity to have, for example, a normalized value between 0 and 1, with a value of one indicating complete similarity, and a value of zero indicating complete dissimilarity. In some implementations the similarity value may also be negative (e.g., between −1 and 0, or between −1 and 1) as well.

Figure 2B:
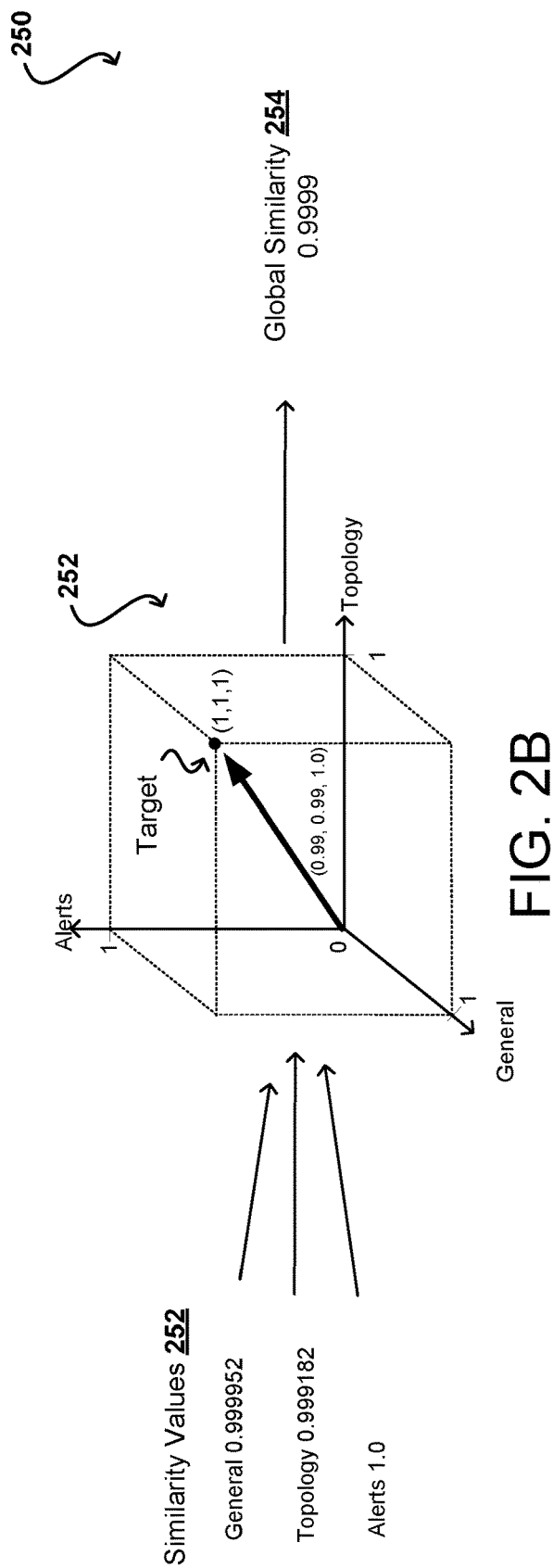

These three values can provide an indication of the similarity between a current incident and a prior incident. It can also provide an indication of where the similarities are stronger or not as strong. An operator might determine that topology or alert similarities are more important than general similarities. In order to help an operator or other such entity to better visualize this similarity data, the three values can be used to generate a global similarity value or similarity vector that can be plotted in three-dimensional space, as illustrated in the plot 252 of FIG. 2B. Each of the three similarity values 252 can be mapped to one of the dimensions of the three-dimensional space. The result is a point (or vector) in three-dimensional space that represents the global similarity value 254. The plot can help an operator to visualize the individual components of the global similarity value, such as to visually determine which components were most similar between the two incidents, and by what extent. Further, determining similarity values for these different categories can prevent one of these categories from predominating the similarity determination if a cosine similarity is determined straight from the numerical fingerprint. An operator can then view such plots for a number of pairs of incidents with the highest global similarity, whereby the operator can determine which data to analyze. In some embodiments, once an operator selects one (or more) of the similarity pairs, the operator can obtain data such as cause and remediation data for a prior event, which can act as a starting point for determining a cause for the current incident and determining potential remediation.

FIGS. 3A and 3B illustrate example topologies determined for two different incidents that may be generated or utilized in accordance with various embodiments. These topologies 300, 350 include nodes that represent devices determined to be involved, or impacted, by an incident, as well as the network connection(s), or interconnection, between those devices. A difficult task in incident identification involves determining the topology of the network, as well as the propagation of the incident throughout that topology. Without an ability to automatically determine and compare these topologies, it can take a significant amount of operator time to attempt to determine similarities of device impact for various incidents. It also could be difficult for an operator to determine a significance of differences with respect to the incidents. Topologies of different events can vary widely, as an event might start in the middle of a network and propagate all the way to a network edge along multiple paths, or may occur only between two directly-connected devices, among other such options. A component such as an event generator can extract or obtain information about a topology for an incident, such as the devices involved, the connections between those devices, and the distances or lengths of those connections. This information can then be used to numerically represent topologies such as those illustrated in FIGS. 3A and 3B.

Figure 4:
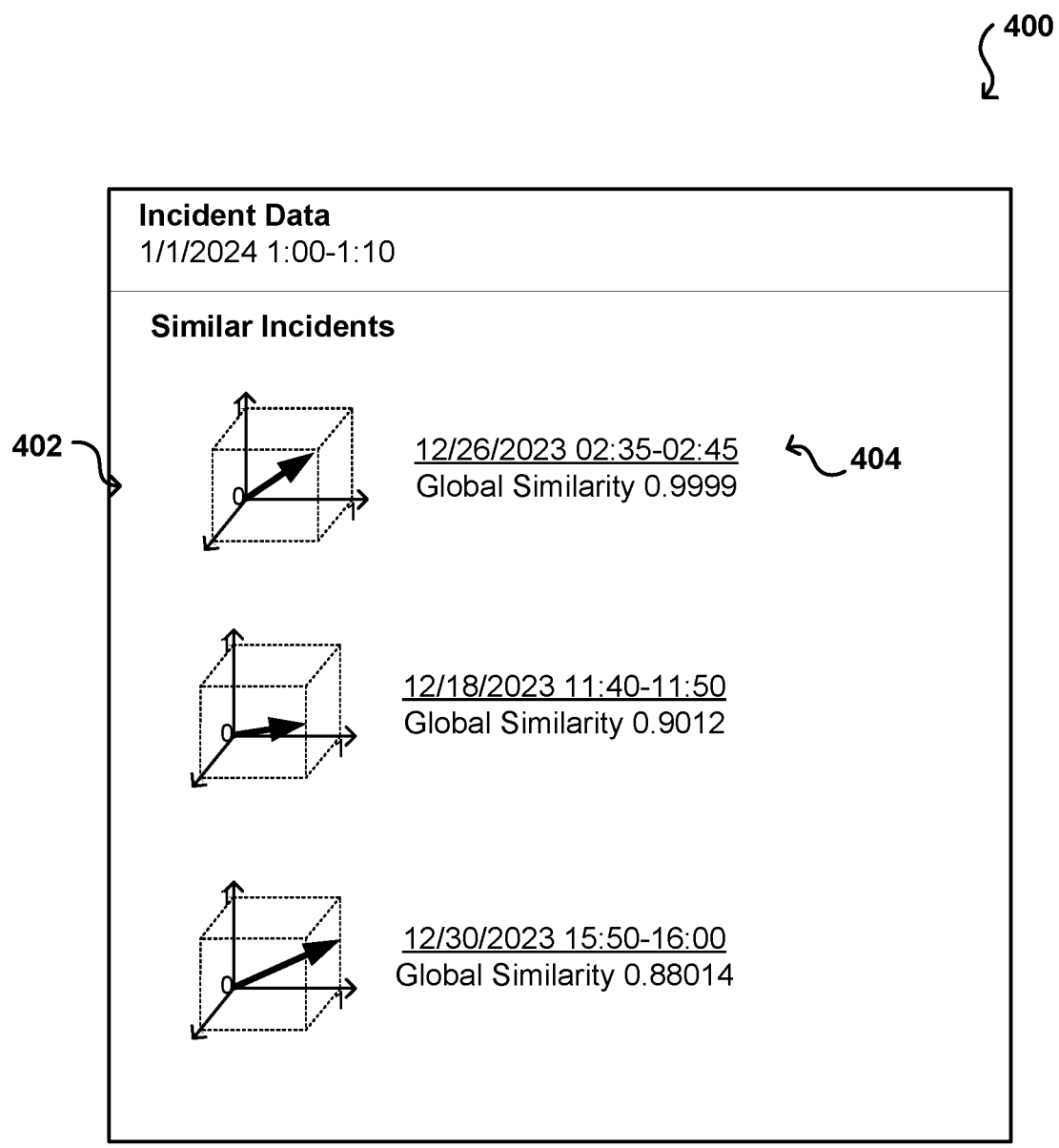
FIG. 4 illustrates an example interface that can be generated in accordance with various embodiments.

FIG. 4 illustrates an example interface 400 that can be provided for display to an operator after similarity determinations have been made for an incident. In this example, data is displayed for the three incidents with the highest similarity to a current incident. This can include at least some identifying information 404 for each incident, as well as a plot of global similarity for each incident. An operator viewing this data can then select one or more of these incidents to obtain further information about that incident, including information about a root cause and remediation for that prior incident. An operator can then use this as a starting point to attempt to remediate the current incident. If the similarity is sufficiently high, such as meeting or exceeding a similarity threshold, then the system can automatically attempt to remediate the current event using the same process that was used to remediate the prior incident, or can recommend that approach of action to the operator for approval, among other such options. Such an interface enables an operator to view information for multiple incidents concurrently, or information for the same or similar incidents at different points in time. An operator can utilize a threshold value to determine whether incidents are sufficiently similar to utilize for cause determination, where that threshold can be at or above around 96% or 97% in some embodiments. In some embodiments, another threshold may be utilized, such as at or above 99%, for which a remediation can be automatically performed by the system where authorized and/or possible. An operator or system may also decide to weight these similarity values differently when determining the global similarity values, in order to allow certain factors to weight more heavily in the similarity determinations. In some embodiments, an operator may also be able to filter displayed plots by specific similarity values, such as topology.

Figure 5:
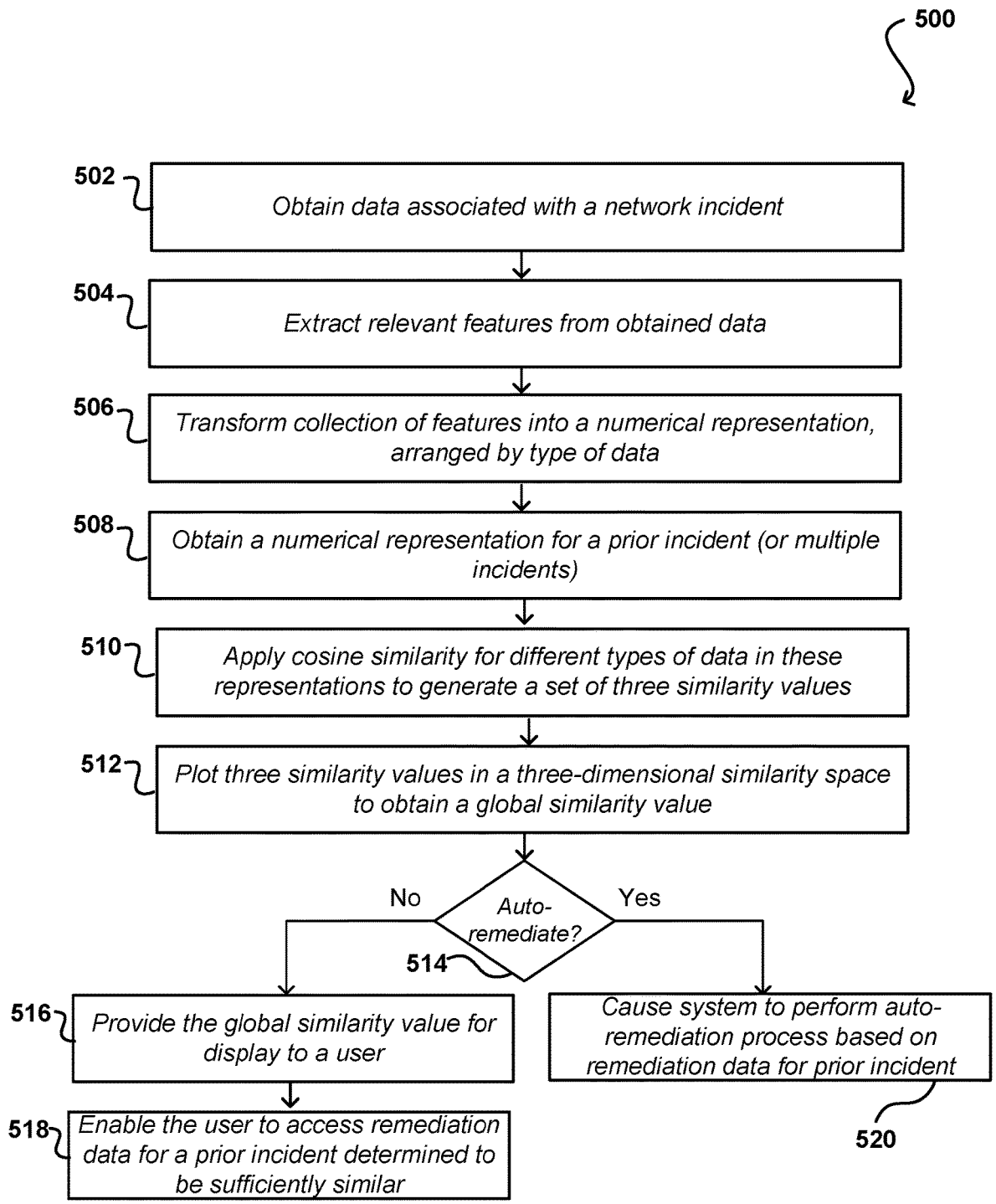
FIG. 5 illustrates an example process for determining incident similarity that can be utilized in accordance with various embodiments.
Figure 6:
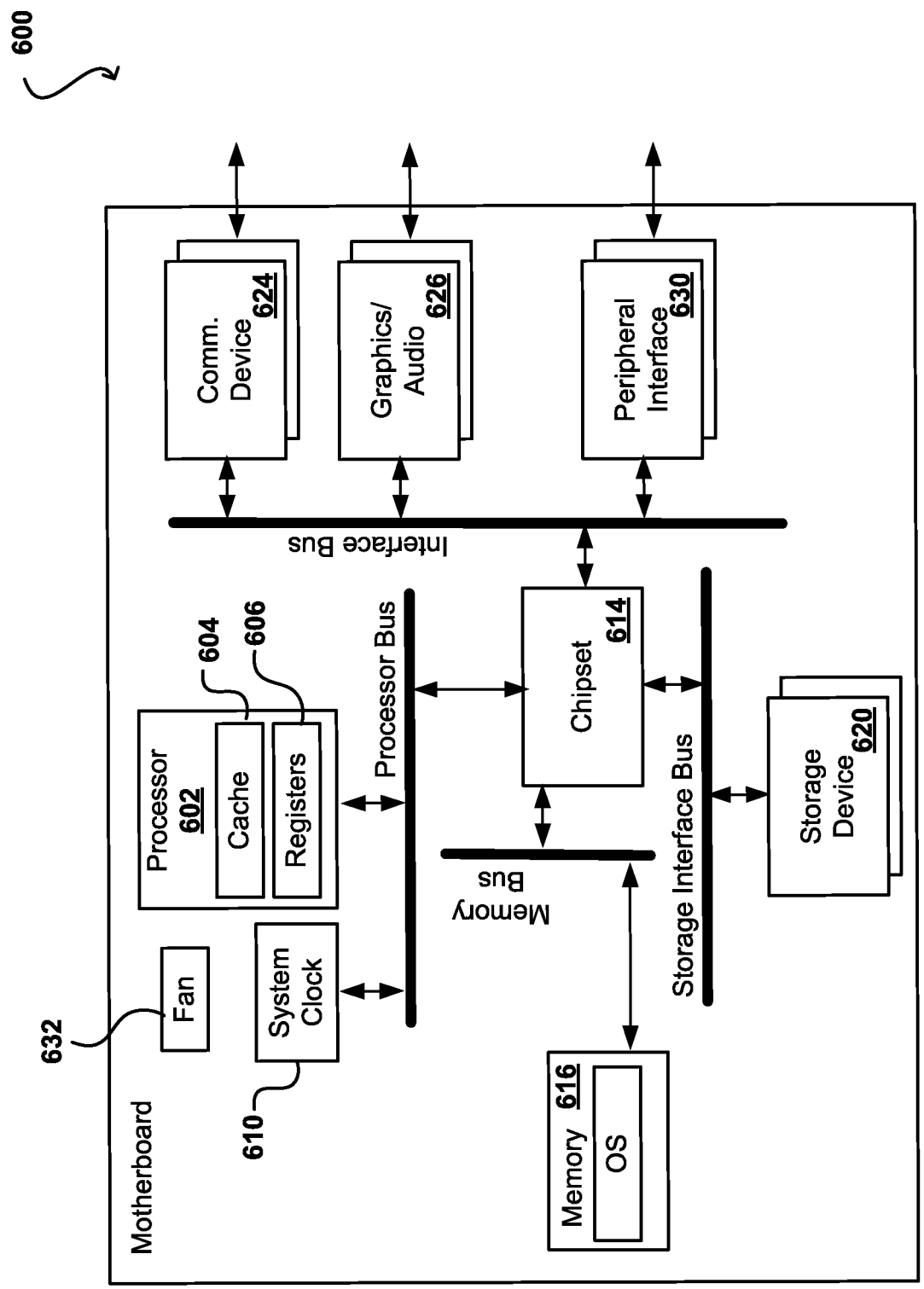
FIG. 6 illustrates components of an example computing device that can be utilized in accordance with various embodiments.

FIG. 5 illustrates an example process 500 for determining similarity between network incidents that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, data is obtained 502 that is, or may be, associated with a network incident. In other embodiments, this data may be collected whether or not an incident is detected, in order to have data before an incidence is detected. In at least one embodiment, this data may be processed with a selection or clustering algorithm or process to attempt to determine data associated to a determined incident based on various similarity criteria, such as time or network proximity. This data can be analyzed to extract 504 relevant features from this obtained data, such as types of features identified as being important, or those selected based on information about an incident. In some embodiments, various rules, algorithms, or machine learning can be used to determine which features to extract, which may include both human understandable features, as well as those that may be important for a network but difficult for a human to understand using plain language. This collection of features can then be transformed 506 into a numerical representation, which can be arranged by type or category of data. As mention, this can include a numerical array in at least some embodiments. Once obtained, a numerical representation can be obtained 508 for at least one prior incidents, and a cosine similarity (or other similarity determination process) can be applied 510 to the types of data represented in the respective portions of those numerical representations. Cosine similarity information for the three categories of incident information can be determined in parallel. In this example, these three similarity values can be plotted 512 in three-dimensional space to obtain, or visually represent, a global similarity value. In some embodiments remediation is performed manually, while in other embodiments automated remediation may be performed, such as by a software system, in at least some circumstances as discussed elsewhere herein. If it is determined 514 that a current incident should not undergo an auto-remediation process, based on factors such as the type of system or type of incident, this global similarity value can be provided 516 for display to a user with respect to one or more highest global similarity values. The user or operator can then be enabled 518 to access remediation data for a prior incident determined to be sufficiently similar. The operator can then use information, such as cause and remediation data, from this prior incident as at least a starting point for diagnosing and remediating a current network incident. This is particularly useful in situations where a current incident and a prior incident may not seem that similar to a network operator, but based on fingerprint generation and similarity comparisons those incidents can be determined to be highly similar, which can provide a recommended starting point for cause diagnosis that might otherwise not have been selected. This can save the operator a significant amount of time, on such as on the order of several hours or more. As mentioned, the system may provide information about the prior incident for review, as well as a recommended remediation approach based on the prior incident. If it is determined that auto-remediation should be performed, the system or service can cause 520 the system to attempt automated remediation, such as where the determined similarity to an earlier incident is sufficiently high and the remediation is a type that can be performed through an automated process, among other such options. If the incident is unable to be completely addressed through auto-remediation, then information for the incident can be provided to a user or operator to attempt a manual remediation based at least in part upon information for the current and prior incident(s). In addition to reducing operator time, such a process can also improve performance of the network as a whole because a remediation can be performed more quickly, resulting in less downtime or reallocation of resources, as well as less downtime for applications or services utilizing those network resources.

Once a root cause is determined, for example, potential remediations can be determined based at least in part upon the cause. These potential remediations can be taken from one or more similar incidents. Potential remediation actions can include, for example, shifting traffic out of a device and performing a reboot, shutting down an interface, or take a device out of service. Other actions can be taken as well, such as to reduce or redirect a flow of network traffic, block a flow of traffic through an access control list (ACL), and so on. In some embodiments this can be an interactive remediation process, where similarity data can be updated after a remediation action has been taken, such as to determine whether the incident has been remediated, or if the incident has changed to a different state or type, as may have resulted at least in part from the attempted remediation action.

As known for computing devices, the computer will have one or more processors 602, such as central processing units (CPUs), graphics processing units (GPUs), and the like, that are electronically and/or communicatively coupled with various components using various buses, traces, and other such mechanisms. A processor 602 can include memory registers 606 and cache memory 604 for holding instructions, data, and the like. In this example, a chipset 614, which can include a northbridge and southbridge in some embodiments, can work with the various system buses to connect the processor 602 to components such as system memory 616, in the form or physical RAM or ROM, which can include the code for the operating system as well as various other instructions and data utilized for operation of the computing device. The computing device can also contain, or communicate with, one or more storage devices 620, such as hard drives, flash drives, optical storage, and the like, for persisting data and instructions similar, or in addition to, those stored in the processor and memory. The processor 602 can also communicate with various other components via the chipset 614 and an interface bus (or graphics bus, etc.), where those components can include communications devices 624 such as cellular modems or network cards, media components 626, such as graphics cards and audio components, and peripheral interfaces 630 for connecting peripheral devices, such as printers, keyboards, and the like. At least one cooling fan 632 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 602 can obtain data from physical memory 616, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 604 in at least some embodiments. The computing device 600 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 630, a communication device 624, a graphics or audio card 626, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 602 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a processor bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

Figure 7:
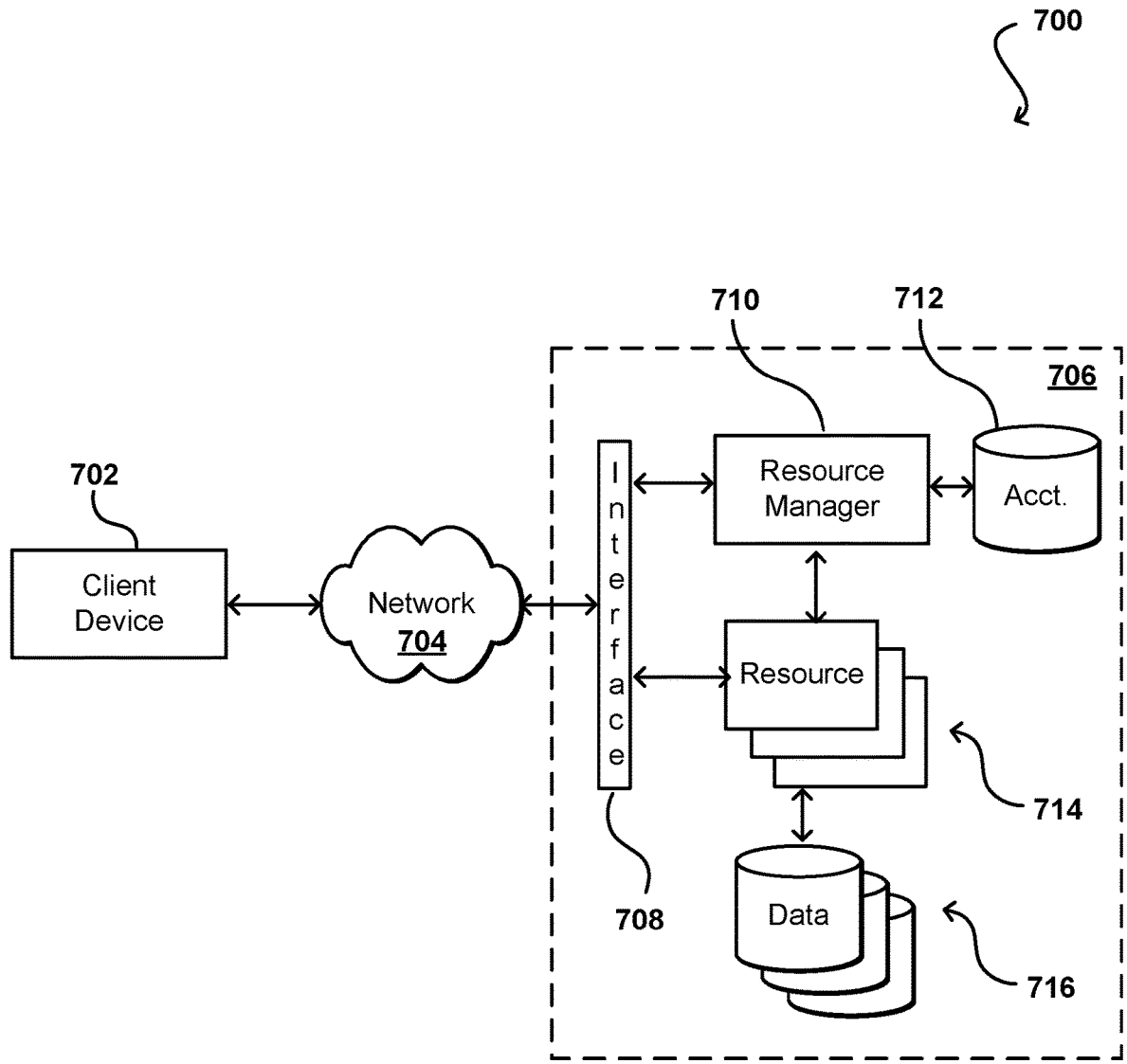
FIG. 7 illustrates components of an example environment in which aspects of various embodiments can be implemented.

As mentioned, such a configuration can be used in some embodiments to provide resource capacity for one or more users or customers as part of a shared resource environment. FIG. 7 illustrates an example of one such environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting a current incident in a computer network;
   selecting, from a collection of captured data for the computer network, a subset of data having a probability of relevance to the current incident;
   extracting, from the subset of data, a set of features indicative of the current incident;
   generating, using the set of features, a current incident fingerprint including a numerical array of three categories of incident data corresponding to the set of features;
   comparing, using a cosine similarity, the incident data from the three categories of the current incident fingerprint against prior incident data from one or more prior incident fingerprints to generate a set of three similarity values for each of the prior incident fingerprints with respect to the current incident fingerprint;
   determining a global similarity value for each of the prior incident fingerprints with respect to the current incident fingerprint using the three similarity values and using a multi-dimensional analysis of the three categories of the incident data, wherein at least one of the three categories is categorized by numerical values in the captured data;
   selecting a prior incident fingerprint having a highest global similarity value; and
   obtaining prior cause and remediation data for a prior computer network incident associated with the selected prior incident fingerprint and configured to be used as a starting point for determining a cause and remediation for the current computer network incident.

2. The computer-implemented method of claim 1, further comprising:
   generating, from the set of features, an intermediate representation that is human-readable; and
   generating the current incident fingerprint from the intermediate representation.

3. The computer-implemented method of claim 1, wherein the three categories include a general category, a topology category, and an alarm category.

4. The computer-implemented method of claim 1, further comprising:
   plotting the three similarity values, for at least one prior incident fingerprint with respect to the current incident fingerprint, in three-dimensional incident space to obtain a visualization of the three similarity values making up a respective global similarity value.

5. The computer-implemented method of claim 1, further comprising:
   sorting the prior incident fingerprints by the global similarity values; and
   providing information for one or more of the prior incident fingerprints having highest global similarity values, wherein the prior cause and remediation data is configured to be obtained for the one or more prior network incident fingerprints.

6. A computer-implemented method, comprising:
   obtaining event data associated with a current incident in a computer network;
   extracting, from the event data, a set of relevant feature data;
   generating, using the set of relevant feature data, a current numerical representation of the current incident;
   comparing the current numerical representation against prior numerical representations for a plurality of prior incidents to generate global similarity values for the plurality of prior incidents with respect to the current incident, individual global similarity values determined from a multi-dimensional analysis of different categories represented in the set of relevant feature data, wherein at least one of the different categories is categorized by numerical values in the event data; and
   determining, based at least in part upon the global similarity values, to obtain cause and remediation for at least one of the prior incidents.

7. The computer-implemented method of claim 6, further comprising:
   collecting performance data for the computer network, the performance data including at least event, connection, and alarm data; and
   identifying at least a portion of the performance data as the event data associated with the current incident using a clustering algorithm.

8. The computer-implemented method of claim 6, wherein the current numerical representation of the current incident is a numerical array consisting of three categories of the event data.

9. The computer-implemented method of claim 8, further comprising:
   generating, using cosine similarity, a set of similarity values for the three categories of event data for each of the prior numerical representations with respect to the current numerical representation.

10. The computer-implemented method of claim 9, further comprising:
    generating global similarity values by combining the set of similarity values for each of the prior numerical representations with respect to the current numerical representation.

11. The computer-implemented method of claim 10, further comprising:
    plotting the set of similarity values, for at least one prior numerical representation with respect to the current numerical representation, in three-dimensional incident space to obtain a visualization of the set of similarity values corresponding to a respective global similarity value.

12. The computer-implemented method of claim 8, wherein the three categories include a general category, a topology category, and an alarm category.

13. The computer-implemented method of claim 6, further comprising:
    generating, from the set of relevant feature data, an intermediate representation that is human-readable; and
    generating the current numerical representation from the intermediate representation.

14. The computer-implemented method of claim 6, further comprising:
    performing an automated remediation of the current incident, using remediation data for a prior incident at the global similarity value for the prior incident, with respect to the current incident, being above a similarity threshold.

15. A system, comprising:
a processor; and
memory including instructions that, when executed by the processor, cause the system to:
obtain event data associated with a current incident in a computer network;
extract, from the event data, a set of relevant feature data;
generate, using the set of relevant feature data, a current numerical representation of the current incident;
compare the current numerical representation against prior numerical representations for a plurality of prior incidents to generate global similarity values for the plurality of prior incidents with respect to the current incident, individual global similarity values determined from a multi-dimensional analysis of different categories represented in the set of relevant feature data, wherein at least one of the different categories is categorized by numerical values in the event data; and
determine, based at least in part upon the global similarity values, to obtain cause and remediation for at least one of the prior incidents.

16. The system of claim 15, wherein the instructions when executed further cause the system to:
collect performance data for the computer network, the performance data including at least event, connection, and alarm data; and
identify at least a portion of the performance data as the event data associated with the current incident using a clustering algorithm.

17. The system of claim 15, wherein the current numerical representation of the current incident is a numerical array consisting of three categories of the event data.

18. The system of claim 17, wherein the instructions when executed further cause the system to:
generate, using cosine similarity, a set of similarity values for the three categories of event data for each of the prior numerical representations with respect to the current numerical representation.

19. The system of claim 18, wherein the instructions when executed further cause the system to:
generate global similarity values by combining the set of similarity values for each of the prior numerical representations with respect to the current numerical representation.

20. The system of claim 19, wherein the instructions when executed further cause the system to:
plot the set of similarity values, for at least one prior numerical representation with respect to the current numerical representation, in three-dimensional incident space to obtain a visualization of the set of similarity values corresponding to the respective global similarity value.

* * * * *

UNITED STATES PATENT AND TRADEMARK OFFICE
CERTIFICATE OF CORRECTION

| | | |
|---|---|---|
| PATENT NO. | : 11,394,629 B1 | Page 1 of 1 |
| APPLICATION NO. | : 17/119560 | |
| DATED | : July 19, 2022 | |
| INVENTOR(S) | : Gianluca Grilli et al. | |

It is certified that error appears in the above-identified patent and that said Letters Patent is hereby corrected as shown below:

On the Title Page

Item (72) Inventor should read:
-- Gianluca Grilli, Seattle, WA (US)
John William Evans, Frome (GB)
Robert William Burke, Dublin (IE)
Donagh Hatton, Dublin (IE)
Diego Tsutsumi, Dublin (IE) --

Signed and Sealed this
Fifteenth Day of July, 2025

Coke Morgan Stewart
*Acting Director of the United States Patent and Trademark Office*